US010992235B2

(12) United States Patent
Gudino Carrizales

(10) Patent No.: US 10,992,235 B2
(45) Date of Patent: Apr. 27, 2021

(54) SOFT SWITCHING FULL-BRIDGE PHASE-SHIFTED DC-DC CONVERTER

(71) Applicant: Robert Bosch GmbH, Stuttgart (DE)

(72) Inventor: Emiliano Gudino Carrizales, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/342,661

(22) PCT Filed: Sep. 20, 2017

(86) PCT No.: PCT/EP2017/073732
§ 371 (c)(1),
(2) Date: Apr. 17, 2019

(87) PCT Pub. No.: WO2018/072953
PCT Pub. Date: Apr. 26, 2018

(65) Prior Publication Data
US 2019/0245455 A1    Aug. 8, 2019

(30) Foreign Application Priority Data
Oct. 18, 2016   (DE) .................... 10 2016 220 358.4

(51) Int. Cl.
*H02M 3/335*   (2006.01)
*H02M 3/337*   (2006.01)
*H02M 1/00*    (2006.01)

(52) U.S. Cl.
CPC ..... *H02M 3/33592* (2013.01); *H02M 3/3376* (2013.01); *H02M 3/33507* (2013.01); *H02M 2001/0051* (2013.01); *H02M 2001/0058* (2013.01); *H02M 2001/0064* (2013.01); *Y02B 70/10* (2013.01)

(58) Field of Classification Search
CPC ......... H02M 3/33592; H02M 3/33507; H02M 3/3376; H02M 3/3374
See application file for complete search history.

(56) References Cited

U.S. PATENT DOCUMENTS 5,235,501 A    8/1993   Stuart et al.
6,442,047 B1 *  8/2002   Cohen ................. H02M 3/1588
                                                    363/132
(Continued)

FOREIGN PATENT DOCUMENTS

CN      101060284 A     10/2007
DE      102012204029    9/2013

OTHER PUBLICATIONS

International Search Report for Application No. PCT/EP2017/073732 dated Jan. 2, 2018 (English Translation, 3 pages).
(Continued)

*Primary Examiner* — Kyle J Moody
*Assistant Examiner* — Jye-June Lee
(74) *Attorney, Agent, or Firm* — Michael Best & Friedrich LLP

(57) ABSTRACT

The present invention relates to a DC-DC converter and to a method for controlling a DC-DC converter with high dielectric strength and reduced power losses. An optimized control of a potential-isolating multi-level half-bridge converter according to a phase-shifted full-bridge configuration with a novel modulation method is proposed.

11 Claims, 3 Drawing Sheets

(56) References Cited

U.S. PATENT DOCUMENTS

| | | | |
|---|---|---|---|
| 6,483,724 B1 | 11/2002 | Blair et al. | |
| 6,995,987 B2* | 2/2006 | Song | H02M 3/33507 363/17 |
| 2011/0249472 A1* | 10/2011 | Jain | H02M 3/3376 363/15 |
| 2013/0051083 A1* | 2/2013 | Zhao | H02J 50/12 363/17 |
| 2014/0153289 A1* | 6/2014 | Kao | H02M 3/3376 363/17 |
| 2015/0138841 A1 | 5/2015 | Pahlevaninezhad et al. | |

OTHER PUBLICATIONS

Gautam et al., "A Zero-Voltage Switching Full-Bridge DC—DC Converter With Capacitive Output Filter for Plug—in Hybrid Electric Vehicle Battery Charging," IEEE Transactions on Power Electronics Institute of Electrical and Electronics Engineers, USA, Bd. 28, Nr. 12, Dec. 2013, pp. 5728-5735.

Yang et al., "High-efficiency soft-switching PWM OC-DC converter for electric vehicle battery chargers," 2013 IEEE Energy Conversion Congress and Exposition, IEEE, Sep. 15, 2013, pp. 1092-1095.

* cited by examiner

SOFT SWITCHING FULL-BRIDGE PHASE-SHIFTED DC-DC CONVERTER

BACKGROUND OF THE INVENTION

The present invention relates to a DC-DC converter and to a method for controlling a DC-DC converter.

In addition to a low-voltage electrical system (12 V on-board electrical system), electric and hybrid vehicles generally also comprise a high-voltage electrical system. This high-voltage electrical system can be fed, for example, by a high-voltage battery, such as a traction battery of the electric or hybrid vehicle for example. The voltage in the high-voltage electrical system generally lies in the region of several 100 V. For the purpose of feeding electrical energy into the low-voltage electrical system, electrical energy can be transmitted from the high-voltage electrical system into the low-voltage electrical system.

Document DE 10 2012 204 029 A1 discloses a transmission apparatus for an electric vehicle with two voltage domains. The apparatus comprises a detection device which detects the state of charge of an energy store of the second voltage domain. The apparatus further comprises a DC-DC converter which transmits electrical power from the first voltage domain to the second voltage domain depending on the state of charge of the energy store in the second voltage domain.

When transmitting electrical energy between the high-voltage electrical system and the low-voltage electrical system, DC isolation is provided between the two electrical systems for safety reasons. Said DC isolation is generally realized by a transformer.

SUMMARY OF THE INVENTION

The present invention provides a DC-DC converter and a method for controlling a DC-DC converter.

Accordingly, the following is provided:

a DC-DC converter comprising a first input connection and a second input connection. An input voltage can be applied between the first input connection and the second input connection of the DC-DC converter. The DC-DC converter comprises a first switching element which is arranged between the first input connection and a first node point, a second switching element which is arranged between the first input connection and the second node point, a third switching element which is arranged between the first node point and the second input connection, and a fourth switching element which is arranged between the second node point and the second input connection. A freewheeling diode can be arranged parallel in relation to the first switching element, the second switching element, the third switching element and the fourth switching element in each case. The DC-DC converter further comprises a transformer with a primary side and a secondary side. A first connection of the primary side of the transformer is electrically coupled to the first node point, and a second connection of the primary side of the transformer is electrically coupled to the second node point. Furthermore, the DC-DC converter comprises a first inductance which is arranged between a first connection of the secondary side of the transformer and a third node point. The DC-DC converter further comprises a rectifier circuit which is designed to rectify an electrical voltage between the third node point and a second connection of the secondary side of the transformer and to provide the rectified voltage between a first output connection and a second output connection. The DC-DC converter further comprises a control device. The control device is designed to initially open the second switching element and the third switching element and to close the first switching element and the fourth switching element. Furthermore, the control device is designed to subsequently open the fourth switching element after a predetermined first time period, and to then open the first switching element once an electric current through the first switching element and/or an electric current through the secondary side of the transformer is smaller than a prespecified threshold value. The control device is further designed to subsequently close the second switching element and the third switching element after a predetermined second time period, and to subsequently open the third switching element after a time period which corresponds to the first predetermined time period. Furthermore, the control device is designed to then open the second switching element once an electric current through the second switching element and/or an electric current through the secondary side of the transformer fall/falls below the prespecified threshold value.

Furthermore, the following is provided:

a method for controlling a DC-DC converter. Said DC-DC converter may be, for example, a DC-DC converter which is designed as described above. The DC-DC converter comprises, in particular, a first input connection, a second input connection, a first switching element which is arranged between the first input connection and a first node point, a second switching element which is arranged between the first input connection and a second node point, a third switching element which is arranged between the first node point and the second input connection, a fourth switching element which is arranged between the second node point and the second input connection. A freewheeling diode can be arranged parallel in relation to the first to fourth switching element in each case. The DC-DC converter further comprises a transformer with a primary side and a secondary side, wherein a first connection of the primary side is electrically coupled to the first node point, and a second connection of the primary side is electrically coupled to the second node point. Furthermore, the DC-DC converter comprises a first inductance which is arranged between a first connection of the secondary side of the transformer and a third node point, and a rectifier circuit which is designed to rectify an electrical voltage which is applied between the third node point and a second connection of the secondary side of the transformer. The DC-DC converter further comprises a first output connection and a second output connection, wherein the DC-DC converter provides the rectified voltage between the first output connection and the second output connection. The method comprises the steps of opening the second switching element and the third switching element; closing the first switching element and the fourth switching element; opening the fourth switching element once the fourth switching element has been open for a predetermined first time period; monitoring an electric current through the first switching element and/or an electric current through the secondary side of the transformer; opening the first switching element once the monitored electric current through the first switching element and/or through the secondary side of the transformer is smaller than a prespecified threshold value; closing the second switching element and the third switching element once the first switching element has been open for a predetermined second time period; opening the third switching element once the third switching element has been open for a predetermined time period which corresponds to the first predetermined time period; monitoring an electric current through the second switching element and/or an electric current through the secondary side of the transformer; and opening the second switching element once the monitored electric current through the second switching element and/or through the secondary side of the transformer is smaller than the prespecified threshold value.

The present invention is based on the finding that, in a boost mode of a full-bridge phase-shifted (FBPS) DC-DC converter with energy flow from a low-voltage side to a high-voltage side, the switching elements on the input side of the DC-DC converter are generally subjected to hard switching. A so-called "reverse recovery effect" can occur in the rectifier components (diodes) depending on the reverse voltage level or the voltage on the high-voltage side. In this case, the diode cannot immediately receive the reverse voltage, but rather it is conductive for a short time in spite of the reverse voltage being applied. This creates a short and high current pulse through the diode. This current pulse causes high losses in the component. Conventional body diodes, as are used for MOSFETs on the high-voltage side for example, are generally not designed for an operating mode of this kind. Therefore, the structural elements can be damaged during long-term operation in this mode.

The present invention is therefore based on the idea of taking this finding into account and providing a DC-DC converter which can be constructed in a cost-effective manner and at the same time exhibits switching losses which are as low as possible. In particular, one idea of the present invention is to provide a modulation method for a potential-isolating DC-DC converter, in which method the individual components, in particular the semiconductor switches, are subjected to as low a level of loading as possible due to the above-described reverse-recovery effect.

To this end, the present invention provides a modulation method for a PSFB DC-DC converter, in which method the switching losses can be reduced on account of innovative control of the individual semiconductor switches. By virtue of reducing the switching losses in the individual switching elements, the power loss of the rectifier circuit also falls. Therefore, less heat has to be dissipated too. This allows more efficient cooling together with a smaller installation space or volume of the circuit construction. Therefore, the overall cost of the rectifier circuit can also be reduced. Furthermore, the expenditure on interference-suppression measures required in respect of electromagnetic compatibility also falls on account of the compact construction.

According to one embodiment, an input voltage can be applied between the first input connection and the second input connection. This input voltage is greater than the product of a transformation ratio of the transformer between the primary side and the secondary side and a setpoint output voltage which is intended to be provided between the first output connection and the second output connection of the rectifier circuit of the DC-DC converter. In this case, the circuit construction between the input connections and the transformer is operated as a step-down converter which provides a modulated voltage in this step-down converter operating mode, the mean value of which modulated voltage is smaller than the DC voltage between the input connections of the DC-DC converter.

According to one embodiment, the first predetermined time period can be adjusted depending on an input voltage between the first input connection and the second input connection and/or a setpoint output voltage. In this way, voltage regulation for the output voltage of the DC-DC converter can be achieved by adjusting the time period.

According to one embodiment, the rectifier circuit of the DC-DC converter comprises an active synchronous rectifier circuit. By way of example, the rectifier circuit can comprise a fifth switching element which is arranged between the third node point and the first output connection, a sixth switching element which is arranged between the second connection of the secondary side of the transformer and the first output connection, a seventh switching element which is arranged between the third node point and the second output connection, and an eighth switching element which is arranged between the second connection of the secondary side of the transformer and the second output connection. Active rectification of the voltage which is provided by the secondary side of the transformer can be achieved in this way.

According to one embodiment, the control device of the rectifier circuit is designed to control the switching elements of the active rectifier circuit depending on the switching states of the first switching element and of the second switching element. The synchronization of the switching elements of the rectifier circuit can be realized in a particularly simple manner in this way.

According to one embodiment, the DC-DC converter comprises a current sensor. The current sensor is designed to detect an electric current through the secondary side of the transformer and/or to detect an electric current through the first switching element and also through the second switching element. The currents which are required for controlling the switching elements of the DC-DC converter can be detected in a particularly simple manner in this way.

According to one embodiment of the method for controlling a DC-DC converter, the second time period is adjusted depending on a dead time of the first switching element and/or a dead time of the second switching element.

The above refinements and developments can, where expedient, be combined with one another in any desired manner. Further refinements, developments and implementations of the invention also comprise combinations, which have not been explicitly mentioned, of features of the invention described above or below in respect of the exemplary embodiments. In particular, a person skilled in the art will in this case also add individual aspects as improvements or additions to the respective basic forms of the invention.

BRIEF DESCRIPTION OF THE DRAWINGS

The present invention is explained in more detail in the following text with reference to the exemplary embodiments specified in the schematic figures of the drawings, in which.

DETAILED DESCRIPTION

Figure 1:
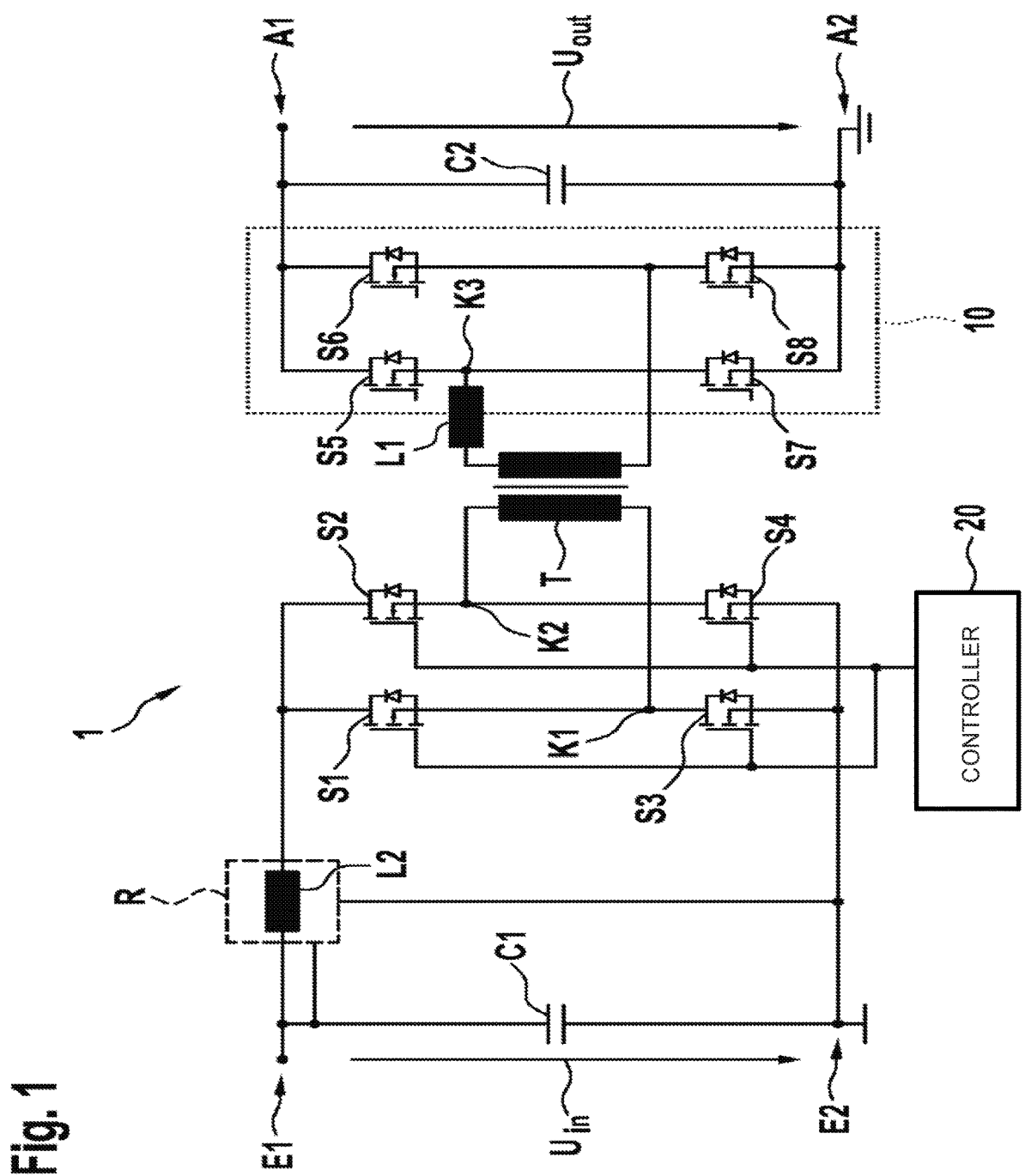
FIG. 1: shows a schematic illustration of a circuit diagram of a DC-DC converter according to one embodiment.

FIG. 1 shows a schematic illustration of a circuit diagram of a DC-DC converter 1 according to one embodiment. The DC-DC converter 1 comprises a first input connection E1 and a second input connection E2. An input voltage Uin can be applied between the first input connection E1 and the second input connection E2. A capacitance C1 can optionally be provided between the first input connection E1 and the second input connection E2. A first switching element S1 is arranged between the first input connection E1 and a first node point K1. A second switching element S2 is arranged between the first input connection E1 and a second node point K2. Furthermore, a third switching element S3 is arranged between the first node point K1 and the second input connection E2, and a fourth switching element S4 is arranged between the second node point K2 and the second input connection E2. A freewheeling diode can be arranged parallel in relation to each of the four switching elements S1 to S4. An inductance L2 is further arranged between the first input connection E1 and a node point at which the first switching element S1 and the second switching element S2 are connected to the first input connection E1. In addition, a so-called reverse operation circuit R can be provided, it being possible for said reverse operation circuit to return any electrical energy which may be stored in the inductance L2 to an electrical system which is connected to the input connections E1, E2 in order to prevent high voltage transients.

The four switching elements S1 to S4 may be, for example, any desired semiconductor switching elements such as metal-oxide field-effect transistors (MOSFETs), bipolar transistors with an insulated-gate connection (IGBTs) or any other desired semiconductor switching elements.

Furthermore, the DC-DC converter 1 comprises a transformer T with a primary side and a secondary side. A first connection of the primary side of the transformer T is electrically coupled to the first node point K1, and a second connection of the primary side of the transformer T is electrically coupled to the second node point K2. An inductance L1 is arranged between a first connection of the transformer T and a third node point K3 on the secondary side of the transformer T. The third node point K3 and also a second connection of the secondary side of the transformer T are electrically coupled to a rectifier circuit 10. Said rectifier circuit 10 may be, for example, a passive bridge rectifier. As an alternative, the rectifier circuit 10 may also be an active synchronous rectifier or the like. By way of example, a fifth switching element S5 can be arranged between the third node point K3 and a first output connection A1 of the rectifier circuit 10, which first output connection also represents an output connection of the DC-DC converter at the same time. A sixth switching element S6 is arranged between the second connection of the secondary side of the transformer T and the first output connection A1. Furthermore, a seventh switching element S7 is arranged between the third node point K3 and a second output connection A2 of the rectifier circuit 10, and an eighth switching element S8 is arranged between the second connection of the secondary side of the transformer T and the second output connection A2. In this case, a freewheeling diode can be arranged parallel in relation to the fifth to eighth switching element S5-S8 in each case. Furthermore, a capacitance C2 can be provided between the first output connection A1 and the second output connection A2.

In this way, a prespecified setpoint output voltage can be provided between the first output connection A1 and the second output connection A2 by suitable control of the switching elements S1 to S4 and possibly S5 to S8 of the DC-DC converter 1. To this end, the switching elements can be controlled by a control device 20 in a corresponding manner.

Control according to the invention of the switching elements is described by way of example in the following text.

While the second switching element S2 and the third switching element S3 are initially open, the first switching element S1 and the fourth switching element S4 are closed together. The input voltage Uin minus the voltage drop across the inductance L2 is then applied to the primary side of the transformer T. A voltage is induced on the secondary side of the transformer T by the magnetic coupling between the primary side and the secondary side of the transformer T. This voltage triggers a current flow through the inductance L1. Here, the inductance L1 can be realized as a separate external structural element or possibly also as a stray inductance of the transformer T. The inductance L1 constitutes, in particular, a resonant inductance of the DC-DC converter 1 or a stray inductance of the transformer T.

In the above-described switching state, a current flow through the inductance L1 is initially established and the capacitance C2 between the first output connection A1 and the second output connection A2 is charged by means of the closed switching elements S5 and S8. Here, the switching elements S6 and S7 are off.

After a predetermined period t1, the fourth switching element S4 is initially opened, while the first switching element S1 remains closed. In this case, the electric current is commutated through the primary side of the transformer T from the fourth switching element S4 to the freewheeling diode parallel in relation to the second switching element S2. Furthermore, the electric current also flows across the closed first switching element S1. On the secondary side of the transformer, the electric current further flows through the closed fifth switching element S5 and the closed eighth switching element S8.

No further electrical energy is fed from the input connections E1 and E2 to the DC-DC converter 1 during the switching state described last. Here, this state is referred to as freewheeling in the following text. Here, in particular, the electrical energy which is stored in the inductance L1 is passed to the capacitor C2 between the first and the second output connection A1, A2. In the further course, the electric current on the secondary side through the inductance L1 will drop from a maximum value to zero. If the electric current through the inductance L1 and therefore also through the secondary side of the transformer T has decayed to zero or approximately zero amperes, the electric current on the primary side of the transformer T and therefore in particular through the first switching element S1 is likewise approximately zero amperes. The first switching element S1 can then be opened at zero current. Here, in particular, the switching losses during opening of the first switching element S1 are minimal. Since no further electric current flows on the secondary side in this case either, the fifth switching element S5 and the eighth switching element S8 can also be opened at zero current and therefore at zero power.

Once all switching elements are open in the switching state described last, the same switching operation with an opposite mathematical sign can then be repeated after a further time period t2, as will be described in the following text. Here, the time period t2 between the opening of the first switching element S1 (and the switching elements S5 and S8) should correspond at least to a dead time of the first switching element S1. Parasitic effects of the structural elements, in particular of the switching elements S1-S4, can lead to a switching delay. By virtue of taking into account a dead time which takes these properties into consideration, it is possible to ensure that no further electric current will flow through the first switching element S1 when the further switching profiles are initiated.

For the purpose of further energy transmission, the second switching element S2 and the third switching element S3 are then initially closed. In response, an electric current flows from the first input connection E1 through the second switching element S2, the primary side of the transformer T and the third switching element S3 to the second input connection E2. An electric current is then induced on the secondary side of the transformer T, and electric current begins to flow through the secondary side of the transformer T, the inductance L1 and also the two, likewise closed, switching elements S6 and S7 (sixth and seventh switching element) into the second capacitance C2.

After a predetermined period, which preferably corresponds to the above-described first period t1, the third switching element S3 is then opened. The electric current is then commutated through the freewheeling diode parallel to the first switching element S1.

In the meantime, an electric current has become established through the inductance L1 on the secondary side, said electric current from now on decaying from a maximum value to approximately zero amperes. As soon as the electric current on the secondary side through the inductance L1 has decayed to approximately zero amperes, no more electric current flows through the still-open sixth and seventh switching element S6 and S7 either. Accordingly, after the decay of the electric current, no more electric current flows on the primary side through the second switching element S2 either. The second switching element S2 and also the sixth switching element S6 and the seventh switching element S7 can then be opened at zero current and therefore at zero power.

After a further time period, which preferably corresponds to the above-described second time period t2, the above-described switching operation can then be repeated with closing of the first switching element S1 and the fourth switching element S4.

In this case, the electric current through the inductance L2 is abruptly interrupted when the fourth switching element S4 is opened or when the third switching element S3 is opened in the above-described switching operations. In this case, high voltage transients may possibly occur. In order to avoid damage which is caused by this, a so-called "reverse operation circuit" R may possibly be provided between the first input connection E1 and a connection point of the first switching element S1 and the second switching element S2.

In the above-described switching states in which an electric current flows through a freewheeling diode parallel to a switching element, the corresponding switching element can optionally be actively controlled and closed in each case. In this way, it is possible to reduce the on-state losses yet further since the electrical semiconductor switching elements generally exhibit lower losses than a freewheeling diode which is arranged parallel in relation thereto.

In this case, control of the first switching element S1 to fourth switching element S4 is performed in a so-called "buck mode" (step-down converter mode). The period to be set for the freewheeling, that is to say the prespecified first period t1, depends in this case on the output voltage to be provided, on a transformation ratio of the transformer T, on the maximum secondary current or primary current, on the input voltage Uin and also on the inductance L1. Since both the inductance L1 and also the transformation ratio of the transformer T can be regarded as being constant, it can be assumed, when the input current for the DC-DC converter 1 is limited to a maximum value, that the output voltage Uout of the DC-DC converter is directly proportional to the first time period t1 for the freewheeling. This allows particularly simple closed-loop control of the output voltage Uout.

Figure 2:
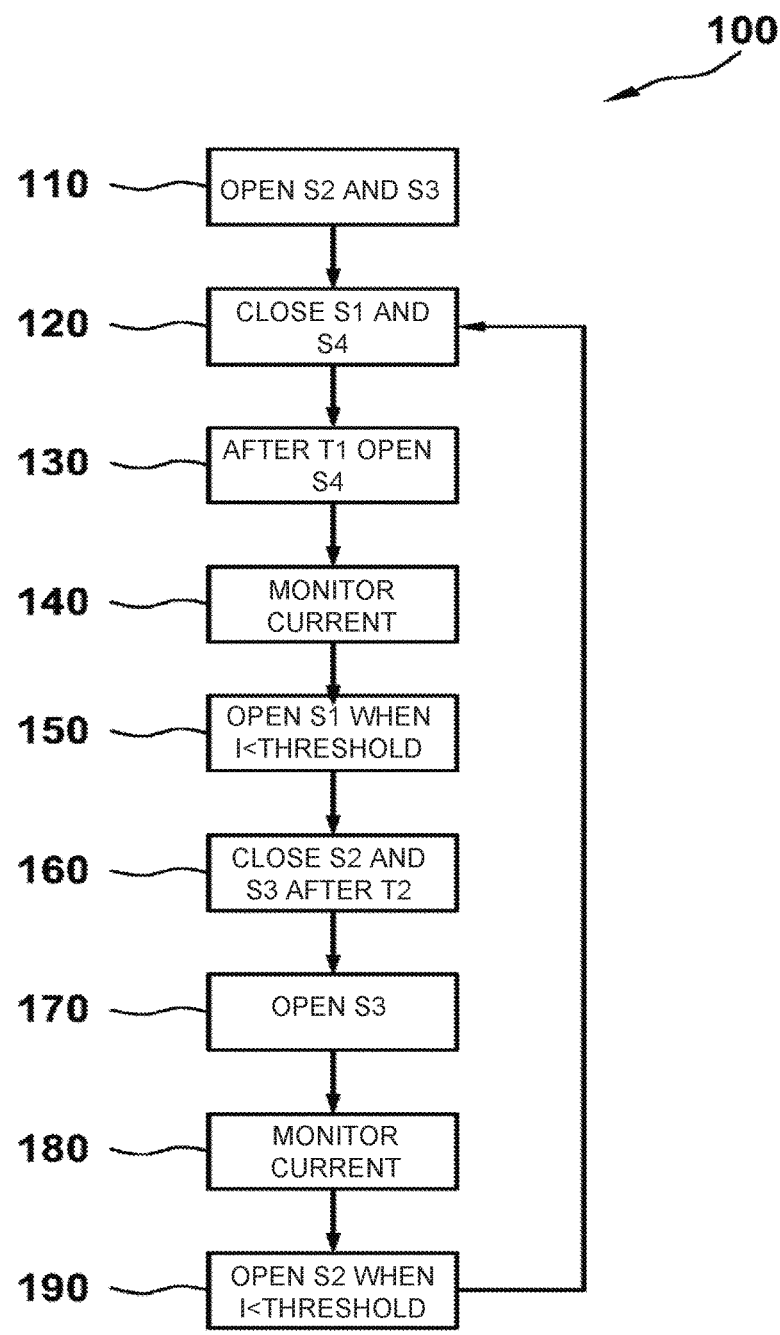
FIG. 2: shows a schematic illustration of a flowchart as forms the basis of a method for controlling a DC-DC converter according to one embodiment.

FIG. 2 shows a schematic illustration of a flowchart as forms the basis of a method 100 for controlling a DC-DC converter according to one exemplary embodiment. The DC-DC converter for this method may be, in particular, an above-described DC-DC converter 1. Initially, in step 110, the second switching element S2 and the third switching element S3 are opened. In step 120, the first switching element S1 and the fourth switching element S4 are closed. After a predetermined first time period t1, the fourth switching element S4 is then opened again. In this case, in step 140, an electric current through the first switching element S1 and/or through the secondary side of the transformer T is monitored. If it is detected in the process that the electric current through the first switching element S1 and/or through the secondary side of the transformer T is smaller than a prespecified threshold value, the first switching element S1 is opened in step 150. Therefore, this first switching element S1 is opened at zero current. Then, in step 160, the second switching element S2 and the third switching element S3 can be closed after a further, predetermined time period t2. After a prespecified time period, which preferably corresponds to the predetermined first time period t1, has elapsed, the third switching element S3 is then opened in step 170. Then, in step 180, the electric current through the second switching element S2 and/or the electric current through the secondary side of the transformer T are/is monitored. If it is detected in the process that the electric current through the second switching element S2 and/or through the secondary side of the transformer T is smaller than a prespecified threshold value, the second switching element is opened at zero current in step 190. The above-described method steps can then be repeated.

In this case, a suitable current sensor (not illustrated) can be provided for the purpose of monitoring the electric current on the secondary side of the transformer and/or monitoring the electric current through the switching elements on the primary side of the transformer.

Figure 3:
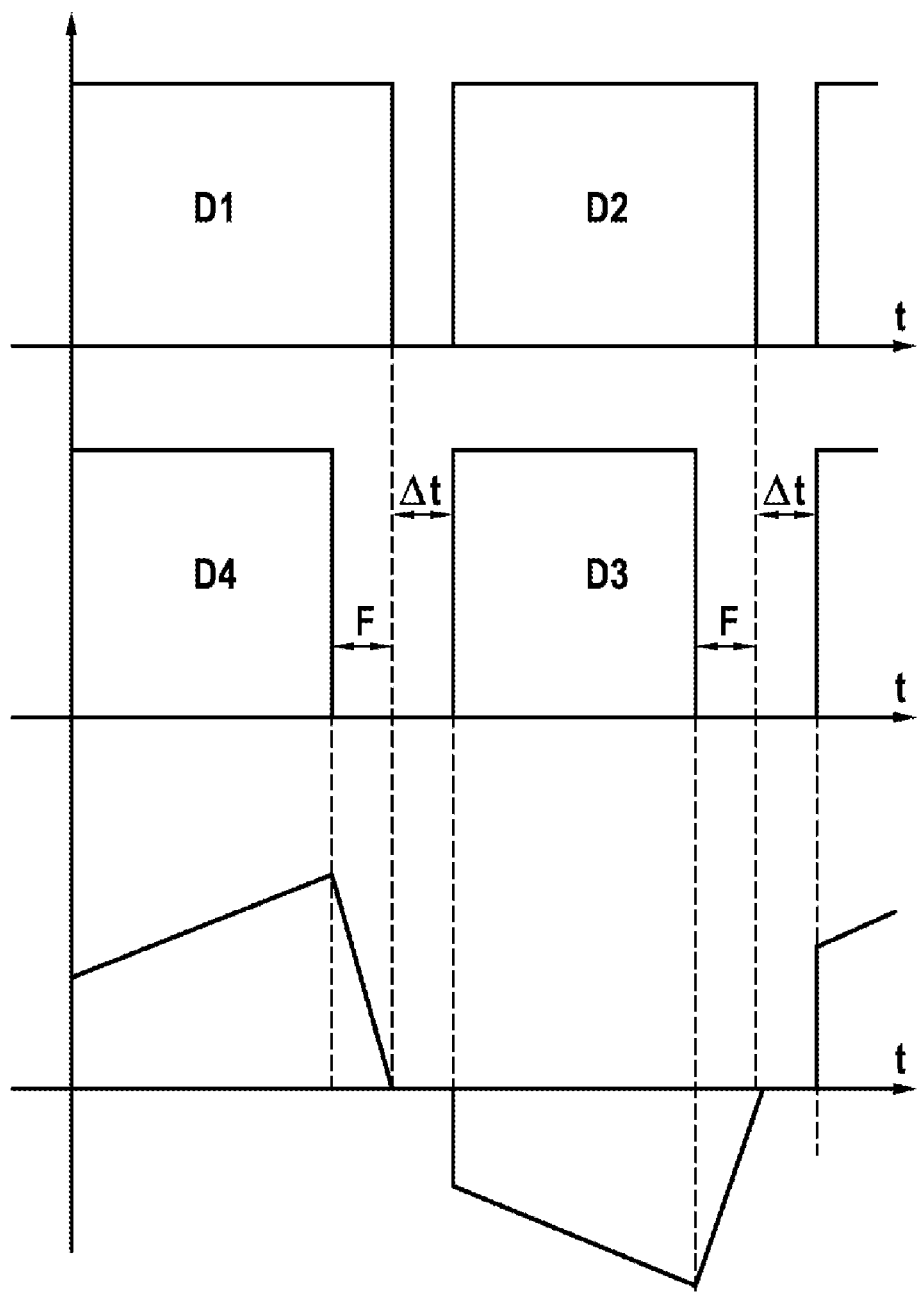
FIG. 3: shows a schematic illustration of the switching sequences as form the basis of one embodiment.

FIG. 3 shows a schematic illustration of the modulation method and also of the secondary current profile according to one exemplary embodiment. The control signals of the first and the second switching element S1, S2 (high-side switching elements) are illustrated in the upper graph, the control signals of the third and the fourth switching element S3, S4 (low-side switching elements) are illustrated in the middle graph, and the profile of the secondary current is illustrated in the lower graph.

First of all, the first and the fourth switching element S1 and S4 are switched on together. As a result, a voltage is applied to the primary side of the transformer winding of the transformer T and triggers a current flow from the input side into the primary winding. Owing to the magnetic coupling of the two inductances in the transformer T, a voltage is induced on the secondary winding, said voltage triggering a current flow from the secondary winding, through the resonant inductance L1, the switching elements S5 and S8, into the output capacitor C2. The resonant inductance L1 and the output capacitance C2 are charged and the output voltage grows. Next, the fourth switching element S4 is switched off. The first switching element S1 remains switched on in the process. The primary current is commutated from the fourth switching element S4 into the body diode of the second switching element S2 and now flows through this diode, and further through the first switching element S1 and the primary winding. The secondary current further flows through the fifth switching element S5 and the eighth switching element S8. In this operating state, the primary winding of the transformer T is short-circuited, and therefore there is no energy transmission from the input side E1, E2 to the transformer T and to the capacitor C2 which is situated on the output side. This state is called freewheeling. Here, the primary current and also the secondary current continue to flow, but there is no longer any energy transmission from the primary circuit to the secondary circuit. The energy stored in the inductance L1 is further passed to the capacitor C2 during freewheeling. In the process, the secondary current is reduced from maximum to zero. When the fourth switching element S4 is switched off, the current through the inductance L2 on the input side is abruptly interrupted. In the process, high-voltage transients, which can damage the switching elements, can arise. In order to avoid this, the energy stored in L2 is returned to the network on the input side between E1 and E2 by the reverse operation circuit R, so that no voltage transients occur. If the secondary current is zero, the primary current is also zero and the first switching element S1 is switched off at this time. Both the switching elements S1-S4 on the primary side and also the switching elements S5-S8 on the secondary side are switched off at zero current and therefore zero power. The reverse recovery effect of the rectifier diodes on the secondary side is reduced owing to the zero-current switch-off process. The first half-period is concluded with the first switching element S1 being switched off After a dead time Δt, the second switching element S2 and the third switching element S3 are switched on and the process is restarted in the opposite direction with the second half-bridge.

In summary, the present invention relates to a DC-DC converter, and also to a method for controlling a DC-DC converter with a high dielectric strength and also reduced power losses. Optimized control of a potential-isolating multilevel half-bridge converter in accordance with a phase-shifted full-bridge configuration with a novel modulation method is proposed here.

The invention claimed is:

1. A DC-DC converter (1), comprising
a first input connection (E1);
a second input connection (E2);
a first switching element (S1) which is arranged between the first input connection (E1) and a first node point (K1);
a second switching element (S2) which is arranged between the first input connection (E1) and a second node point (K2);
a third switching element (S3) which is arranged between the first node point (K1) and the second input connection (E2);
a fourth switching element (S4) which is arranged between the second node point (K2) and the second input connection (E2),
freewheeling diodes (D1-D4) arranged in parallel to each of the switching elements (S1-S4);
a transformer (T) with a primary side and a secondary side, wherein a first connection of the primary side is electrically coupled to the first node point (K1) and a second connection of the primary side is electrically coupled to the second node point (K2);
a first inductance (L1) positioned between a first connection of the secondary side of the transformer (T) and a third node point (K3);
a rectifier circuit (10) configured to rectify an electrical voltage which is applied between the third node point (K3) and a second connection of the secondary side of the transformer and to provide a rectified voltage between a first output connection (A1) and a second output connection (A2);

a current sensor configured to detect an electric current through the first switching element (S1) and also through the second switching element (S2); and
a control device (20) configured
to initially, at a first time, close the first switching element (S1) and the fourth switching element (S4) together while the second switching element (S2) and the third switching element (S3) are open;
to, at a second time subsequent to the first time, open the fourth switching element (S4) after a predetermined first time period (t1) while keeping the first switching element (S1) closed and the second switching element (S2) and the third switching element (S3) open;
to, at a third time subsequent to the second time, open the first switching element (S1) once an electric current through the first switching element (S1) or an electric current through the secondary side of the transformer (T) falls below a prespecified threshold value while keeping the second switching element (S2), the third switching element (S3), and the fourth switching element (S4) open;
to subsequently close the second switching element (S2) and the third switching element (S3) after a predetermined second time period (t2) while keeping the first switching element (S1) and the fourth switching element (S4) open;
to subsequently open the third switching element (S3) after the predetermined first time period (t1) while keeping the second switching element (S2) closed and the first switching element (S1) and the fourth switching element (S4) open;
to then open the second switching element (S2) once an electric current through the second switching element (S2) or an electric current through the secondary side of the transformer (T) falls below the prespecified threshold value while keeping the first switching element (S1), the third switching element (S3), and the fourth switching element (S4) open.

2. The DC-DC converter (1) as claimed in claim 1, wherein an input voltage (Uin) between the first input connection (E1) and the second input connection (E2) is smaller than a product of a transformation ratio between the primary side and the secondary side of the transformer (T) and a setpoint output voltage (Uout) which is to be output between the first output connection (A1) and the second output connection (A2).

3. The DC-DC converter (1) as claimed in claim 2, wherein the predetermined first time period (t1) is adjusted depending on the input voltage (Uin) and the setpoint output voltage (Uout).

4. The DC-DC converter (1) as claimed in claim 2, wherein the predetermined first time period (t1) is adjusted depending on the input voltage (Uin).

5. The DC-DC converter (1) as claimed in claim 2, wherein the predetermined first time period (t1) is adjusted depending on the setpoint output voltage (Uout).

6. The DC-DC converter (1) as claimed in claim 1, wherein the rectifier circuit (10) comprises an active synchronous rectifier circuit.

7. The DC-DC converter (1) as claimed in claim 6, wherein the control device (20) is further configured to control additional switching elements (S5-S8) of the rectifier circuit depending on the switching states of the first switching element (S1) and of the second switching element (S2).

8. A method (100) for controlling a DC-DC converter (1), comprising a first input connection (E1), a second input connection (E2), a first switching element (S1) which is arranged between the first input connection (E1) and a first node point (K1), a second switching element (S2) which is arranged between the first input connection (E1) and a second node point (K2), a third switching element (S3) which is arranged between the first node point (K1) and the second input connection (E2), a fourth switching element (S4) which is arranged between the second node point (K2) and the second input connection (E2), wherein a freewheeling diode (D1-D4) is arranged in parallel in relation to each of the switching elements (S1-S4), a transformer (T) with a primary side and a secondary side, wherein a first connection of the primary side is electrically coupled to the first node point (K1) and a second connection of the primary side is electrically coupled to the second node point (K2), a first inductance (L1) which is arranged between a first connection of the secondary side of the transformer (T) and a third node point (K3), a rectifier circuit (10) which is designed to rectify an electrical voltage between the third node point (K3) and a second connection of the secondary side of the transformer (T), and to provide a rectified voltage between a first output connection (A1) and a second output connection (A2), a current sensor configured to detect an electric current through the first switching element (S1) and also through the second switching element (S2); wherein the method comprises:

initially, at a first time, closing (120) the first switching element (S1) and the fourth switching element (S4) together while keeping the second switching element (S2) and the third switching element (S3) open;

opening (130), at a second time subsequent to the first time, the fourth switching element (S4) once the fourth switching element (S4) has been closed for a predetermined first time period (t1) while keeping the second switching element (S2) and the third switching element (S3) open and the first switching element (S1) closed;

monitoring (140) an electric current through the first switching element (S1) or an electric current through the secondary side of the transformer (T);

opening (150), at a third time subsequent to the second time, the first switching element (S1) once the monitored electric current through the first switching element (S1) or through the secondary side of the transformer (T) is smaller than a prespecified threshold value while keeping the fourth switching element (S4), the second switching element (S2), and the third switching element (S3) open;

closing (160) the second switching element (S2) and the third switching element (S3) once the first switching element (S1) has been open for a predetermined second time period (t2) while keeping the first switching element (S1) and the fourth switching element (S4) open;

opening (170) the third switching element (S3) once the third switching element (S3) has been closed for the predetermined first time period (t1) while keeping the second switching element (S2) closed and the first switching element (S1) and the fourth switching element (S4) open;

monitoring (180) an electric current through the second switching element (S2) or an electric current through the secondary side of the transformer (T); and opening (190) the second switching element (S2) once the monitored electric current through the second switching element (S2) or through the secondary side of the transformer (T) is smaller than the prespecified threshold value while keeping the first switching element (S1), the third switching element (S3), and the fourth switching element (S4) open.

9. The method (100) as claimed in claim 8, wherein the second time period (t2) is adjusted depending on a dead time of the first switching element (S1) and a dead time of the second switching element (S2).

10. The method (100) as claimed in claim 8, wherein the second time period (t2) is adjusted depending on a dead time of the first switching element (S1).

11. The method (100) as claimed in claim 8, wherein the second time period (t2) is adjusted depending on a dead time of the second switching element (S2).

* * * * *